March 26, 1929.  F. POKORNY  1,706,817

CONTROL MEANS FOR HEATING AIR SUPPLIED TO INTERNAL COMBUSTION ENGINES

Filed Oct. 10, 1924  2 Sheets-Sheet 1

INVENTOR
Frank Pokorny
BY
Frederick W. Barker
ATTORNEY

March 26, 1929. F. POKORNY 1,706,817
CONTROL MEANS FOR HEATING AIR SUPPLIED TO INTERNAL COMBUSTION ENGINES
Filed Oct. 10, 1924 2 Sheets-Sheet 2
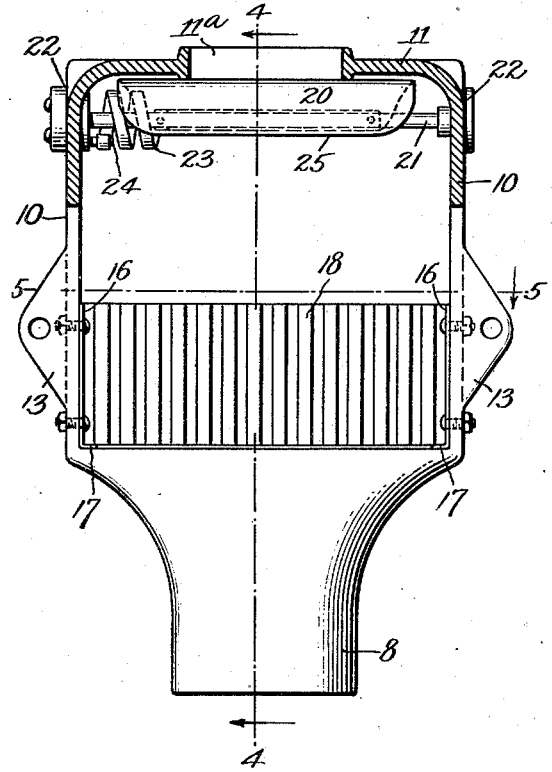
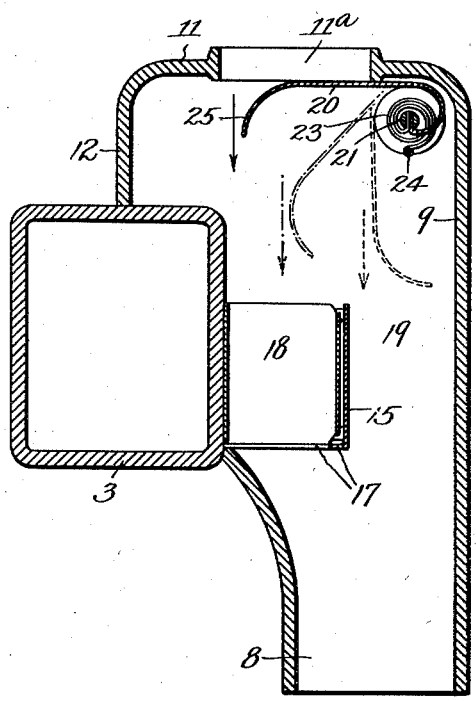
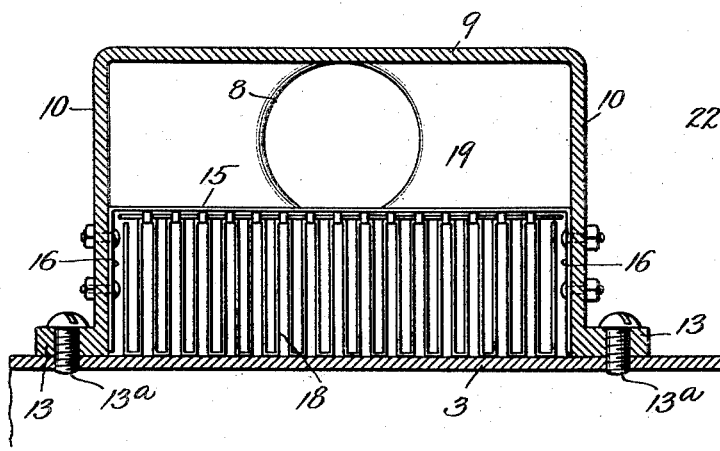
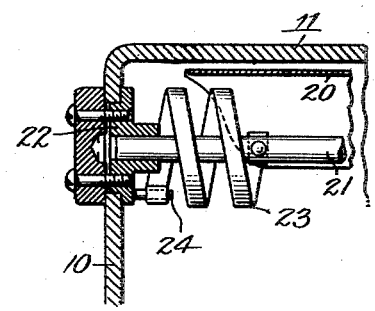
INVENTOR
Frank Pokorny
BY
Frederick W. Barker
ATTORNEY Patented Mar. 26, 1929.

1,706,817

UNITED STATES PATENT OFFICE.

FRANK POKORNY, OF MAMARONECK, NEW YORK.

CONTROL MEANS FOR HEATING AIR SUPPLIED TO INTERNAL-COMBUSTION ENGINES.

Application filed October 10, 1924. Serial No. 742,764.

This invention relates to internal combustion engines and my improvements are particularly directed to control means for varying the temperature of air supplied thereto for combustion supporting purposes.

Acting on the principle that heated air should be supplied to the carburetor at starting up the engine and while the engine speed is low, to promote vaporization of the fuel, and conversely that cool air should be supplied as the engine speeds up and is under load, my present invention consists in the provision of thermo-gravity control means for regulating the temperature of the air supply to accord with the engine needs.

Also my invention includes the provision of means, actuated by the throttle control, for positively shutting off the supply of heated air and opening the air supply passage to the atmosphere with the opening wide of the throttle, so that with the increase in the engine speed under load conditions only cool air will be admitted to the engine.

Other features and advantages of my invention will hereinafter appear.

In the drawing:

Fig. 3 is a front view, partly in section, of the heater.

Fig. 4 is a side sectional view, taken on the line 4—4 of Fig. 3.

Fig. 5 is a horizontal section on the line 5—5 of Fig. 3, and

Fig. 6 is an enlarged detail view of the thermostatic spring.

Figure 1:
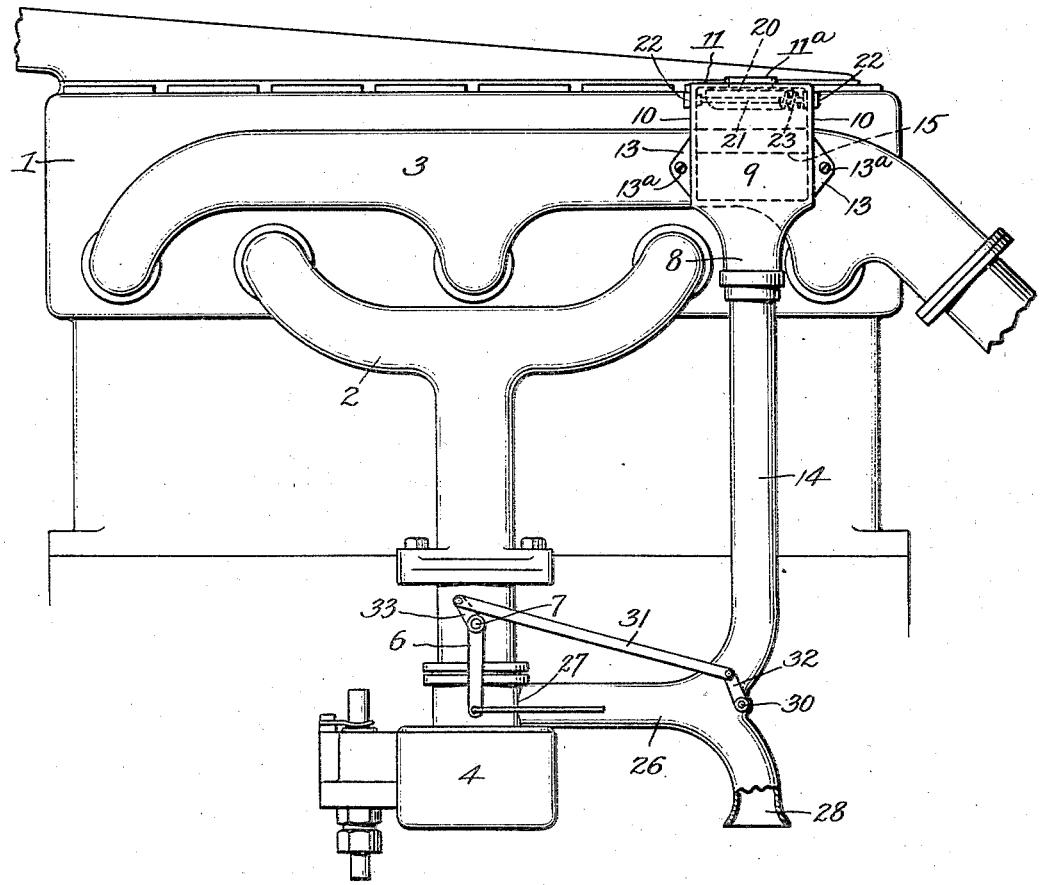
Figure 1 is a side elevation of an engine showing my improved air heater as applied to the exhaust manifold and showing the controlled two-way means for the supply of either heated or cool air to the carburetor.

In said figures let 1 indicate an internal combustion engine, with intake manifold 2, exhaust manifold 3, carburetor 4, and throttle valve 5 having control lever 6 carried by shaft 7.

My improved heater device is in the form of a hollow casting, here shown as rectangular with a pendent tubular portion 8, vertical front wall 9 and sides 10, 10; top 11 with orifice 11ª for air admission, and short rear wall 12, whose edge is adapted to lie against the manifold top, to enclose a portion thereof, while the sides 10, 10 are recessed in order that their edges may lie against the front surface of the manifold. The heater is secured to the manifold by suitable means, such as the lugs 13, 13 and screws 13ª, 13ª. By this arrangement of the heater in association with the exhaust manifold, air passing through the heater becomes heated in transit. The tubular portion 8 of the heater connects with a pipe 14 that communicates with the carburetor 4 and thus supplies heated air for admixture with the fuel.

In the lower portion of the heater, above its pendent tubular portion 8, I fit and secure a vertical partition 15 between the sides 10, 10, said partition having angled sides 16, 16 that lie against the sides 10, 10, and said partition and angled sides having inturned flanges 17 that constitute ledges which removably support a heater element 18. Said heater element is in the form of a folded strip of heat conductive material whose folds are in spaced relation for the passage of air. Since the heater element is contained between partition 15 and the manifold it serves to radiate heat from the latter, and provides an intensified heat zone which highly raises the temperature of air passed therethrough. It is a feature of my invention that air which passes through the heater may be directed in its course so that it passes entirely through this heater element 18, or partially therethrough, or is caused to entirely avoid said heater element and pass in full volume through the clearance 19 at the other side of partition 15, by these means varying the temperature at which the air is delivered to the carburetor. In warm weather the heater element 18 can if desired be removed from the heater.

It will be noted that the axis of air admission orifice 11ª is slightly offset from the axis of tubular pendent portion 8, and is spaced from the heater wall 9 sufficiently to leave a clearance between it and said wall 9 that includes the axis of portion 8.

The arrangement just noted is intended to permit such control to be had of the entering air that it may be subjected in varying degrees to the influence of the heat directly radiated from the manifold and from the heater element 18.

Since it is desirable that air for carburation should have its highest temperature while the engine is cool when first started up it is my purpose to initially cause the volume of air entering the heater through orifice 11ª to impinge upon the manifold and be directed through the folds of heater element 18, because the exhaust manifold is the first part of an engine to become hot, and then, as the engine generally heats up my control means automatically cause the direction of air flow through the heater to be changed, to gradually diminish the heating effect it receives.

These objects are accomplished by means of a valve 20, which is carried by a shaft 21 to lie normally across the orifice 11ª within the heater. The shaft 21 is journalled in the opposite sides of the heater, as at 22, 22, and said shaft is engaged by one end of a coiled spring 23, whose other end is secured to a stud 24 that is fixed to the heater side. The valve is normally held in its horizontal position, shown in full lines in Fig. 4, by the tension of the spring. In this position the valve, which has a downwardly curved end 25, directs entering air against the top surface of the manifold, whence it passes to the heater element 18, for passage therethrough. The valve 20 is subject to the force of gravity and pressure of the inflowing air, and is held in its normal horizontal position by the tension of spring 23. But said spring is composed of metallic material having a certain co-efficient of expansion whereby it is influenced by the increase in temperature to which the heater is subjected, becoming expanded and weakened thereby. The spring then yields gradually under the gravity and pressure forces, causing the valve to move through and into the positions thereof indicated in dotted lines in Fig. 4, and the path of the flowing air changes in consequence to diminish the heating effect it will receive in transit. For example, in the wide open position of the valve a part only of the air volume will pass through heater element 18, and the other part will pass through the clearance between said element and heater wall 9.

It is apparent that in all positions of valve 20 air passing through the heater will be raised in temperature, but the degree to which such air is heated depends upon the extent of the opening movement accorded the valve and the variation in direction of the air flow.

Also I provide means for partially or wholly shutting off the supply of heated air to the carburetor from pipe 14 and for admitting cool air direct from the atmosphere to the carburetor either with or without heated air from pipe 14.

Figure 2:
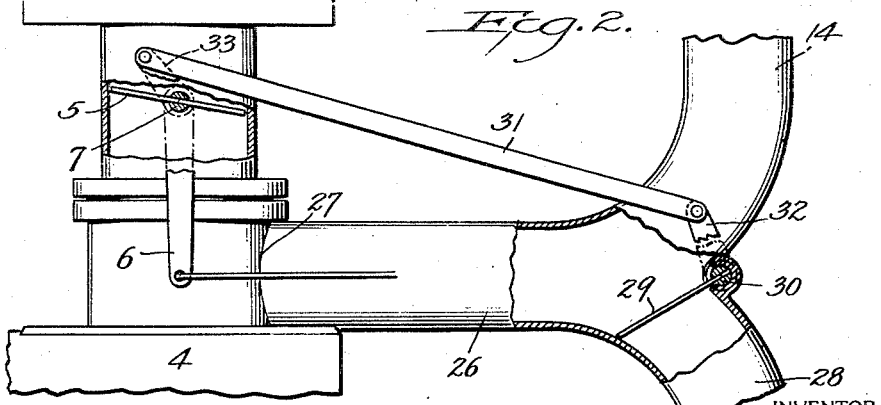
Fig. 2 is an enlarged detail view, partly in section, of the two-way control means.

In the example shown, Figs. 1 and 2, the pipe 14 is provided with an elbow extension 26 that communicates with the carburetor at 27. At this elbow there is a cool air inlet 28, and a valve 29, carried by a pivot 30, is adapted to swing to close either the pipe 14 or inlet 28, and may be moved to admit proportionate quantities of both heated and cool air.

A link 31 connected with an arm 32 extended from pivot 30, and with an arm 33 extended from throttle pivot 7, permits the valve 29 to be operated by and in unison with the operation of the throttle valve.

As shown, with the throttle valve closed, or "partly cracked" for idling purposes, the valve then is in the position where it closes the cool air intake and permits heated air from pipe 14 to flow in full volume to the carburetor. When the throttle is swung wide open this has the effect of causing valve 29 to close pipe 14 and open wide the cool air intake. And when the throttle is moved to an intermediate open position, then valve 29 is also moved to an intermediate position where it permits the flow of heated and cool air in proportionate quantities.

It is of course appreciated that as the engine speed increases consequent upon the greater opening of the throttle, the need for the supply of heated air decreases because better atomization of the fuel is available at the higher velocity of fuel mixture flow which results.

Variations within the spirit and scope of my invention are equally comprehended by the foregoing disclosure.

I claim:

1. The combination, with an internal combustion engine having an exhaust manifold and a carburetor, of a hollow heating device enclosing a surface portion of said manifold and provided with air admission means, a pipe communicating from said heating device to said carburetor, and temperature controlled means within the heating device to direct the flow of air through said heating device in different paths therein relatively to said manifold surface portion, to vary the degree of heat absorbed by the flowing air.

2. The combination, with an internal combustion engine having an exhaust manifold and a carburetor, of a hollow heating device enclosing a surface portion of said manifold and provided with air admission means, an apertured heater element located within the heating device adjacent said manifold surface portion, a pipe communicating from said heating device to said carburetor, and temperature controlled means within the heating device to direct the flow of air through said heating device in different paths therein relatively to said heater element, to vary the degree of heat absorbed by the flowing air.

3. The combination, with an internal combustion engine having an exhaust manifold and a carburetor, of a hollow heating device enclosing a surface portion of said manifold and provided with air admission means, a pipe communicating from said heating device to said carburetor, the cross-sectional area within the heating device providing heat zones of different temperatures, and thermo-gravity controlled means for directing passing air progressively through said zones within said heating device from the higher to the lower temperatures thereof, as said heating device heats up.

4. The combination, with an internal combustion engine having an exhaust manifold and a carburetor, of a hollow heating device enclosing a surface portion of said manifold and provided with air admission means, a pipe communicating from said heating device to said carburetor, the cross-sectional area within the heating device providing heat zones of different temperatures, a gravity valve within said heating device, a thermostatic spring normally holding said valve in position to direct entering air through the hottest zone in the heating device, and said spring relaxing under the influence of temperature increase, permitting said valve to fall and thereby direct the entering air through zones of lower temperature.

5. The combination, with an internal combustion engine having an exhaust manifold and a carburetor, of a hollow heating device enclosing a surface portion of said manifold and provided with air admission means, a pipe communicating from said heating device to said carburetor, the cross-sectional area within the heating device providing heat zones of different temperatures, a gravity valve within said heating device, a thermostatic spring normally holding said valve in position to direct entering air through the hottest zone in the heating device, and said spring relaxing under the influence of temperature increase, permitting said valve to fall and thereby direct the entering air through zones of lower temperature, and means for adjusting the tension of said spring.

6. In a thermostatic regulator for explosive engines, a swinging valve plate located in an air supply conduit leading to a carbureter, a thermostatic spring controlled by the temperature of the air supply in said conduit and having operative engagement with the swinging valve plate, said valve plate being subject to opening movement under influence of the engine suction against the yielding influence of the thermostatic spring.

7. In a regulating device of the character described, an air control valve located in the air supply conduit leading to the carbureter of an explosive engine, a thermostatic member in said conduit controlling the valve and tending to close the valve under decrease of temperature and open the valve as the temperature increases, said valve being further subject to engine suction by which the valve is opened against the influence of the thermostatic member to admit air more freely independent of the temperature within said conduit.

8. In a regulating device for explosive engines, an unbalanced swinging valve in the air supply conduit leading to the carbureter of an explosive engine, a thermostatic spring within said conduit and controlled by the air being drawn therethrough tending to close the valve when the engine is cold and to progressively open the valve as the temperature increases, said valve being capable of opening against the tension of the spring and independent of temperature change by the engine suction.

9. An air choke for carbureters of explosive engines located within the air supply conduit, a valve in said air supply conduit and a thermostatic control tending to open and close said valve, in accordance with variations of the temperature of the air being drawn through said air supply conduit, said valve being subject to opening influence of engine suction in opposition to the closing influence and supplemental to the opening influence of the thermostat.

Executed this 2nd day of October, 1924.

FRANK POKORNY.